United States Patent

[11] 3,533,404

| [72] | Inventor | Joseph A. Labarber, Las Vegas, Nevada |
|---|---|---|
| [21] | Appl. No. | 658,816 |
| [22] | Filed | Aug. 7, 1967 |
| [45] | Patented | Oct. 13, 1970 |
| [73] | Assignee | Turbo Bath Corporation North Hollywood, California a corporation of Nevada |

[54] WATER MASSAGE AERATOR APPARATUS
10 Claims, 4 Drawing Figs.

[52] U.S. Cl. ............................................. 128/66, 4/180
[51] Int. Cl. ........................................... A61h 9/00
[50] Field of Search .......................... 128/65, 66; 4/180

[56] References Cited
UNITED STATES PATENTS

| 2,921,579 | 1/1960 | Munroe | 128/66 |
| 727,425 | 5/1903 | Von Orth | 4/180 |
| 2,848,203 | 8/1958 | Misiura | 4/180 |
| 3,267,936 | 8/1966 | Brady | 128/66 |

Primary Examiner—L. W. Trapp
Attorney—Lowry, Rinehart and Markva

ABSTRACT: This water massage aerator apparatus has a closed square tubing passage with an air inlet and with openings in the sides of the tubing, all of which are held in a body of water, such as a filled bathtub, and function as an aerator to inject air bubbles that disturb the water and thereby massage the body of the person in the water.

Patented Oct. 13, 1970

3,533,404

INVENTOR.
JOSEPH A. LABARBER
BY
Carl R. Brown
Attorney

WATER MASSAGE AERATOR APPARATUS

BACKGROUND OF THE INVENTION

Water ejecting devices such as for example, whirlpool baths and the like are well known for ejecting streams of water that have a massaging effect on the body of the user. These devices provide a relaxing and soothing effect that have many uses. However, these devices are quite expensive and have a complicated structure that normally requires a particularly designed tub or the like for receiving the equipment and correctly directing and containing the ejected water.

I have discovered that the injecting of air into a body of water in a confined volume disturbs the water in such a manner as to accomplish a similar massaging effect upon the body of the user in the water. Thus I have developed a simple and inexpensive apparatus that may be inserted into a bathtub or the like and used by persons in their own home to provide the beneficial massaging effect.

SUMMARY OF THE INVENTION

My invention generally comprises joined sections of square shaped tubing that forms a tubing passage with holes spaced along the sides thereof to inject air in a uniform and substantially equal pressure pattern into the water. An air inlet nozzle provides air from an air blower to the tubing and suction cups secure the assembled tubing passage to the bottom of a water filled bathtub or the like. The tubing passage formed by the assembly of the sections of tubing substantially conforms to the configuration of the outer side walls of the tub. The square shape of the tubing assures that when the tubing sections are coupled together, the air injecting holes are correctly oriented and aligned in the direction that provides the maximum beneficial effect. Thus the embodiment of my invention comprises sections of square shaped tubing that are separated for shipping and storage and are easily assembled for use and disassembled for storage.

The air supply may be provided by the blow side of any known vacuum cleaner that is normally already available in the user's home. The electrical power unit of the vacuum cleaner remains outside of the bathtub at a remote position with the air hose being the only connection to the tubing passage in the water. Thus the user may not fear "something electrical being present in the water". Accordingly through the use of my invention, a gentle, pulsatory, massage type movement of the air and water is created in the tub of water. Thousands of soft, tiny air bubbles are directed at the limbs of the body of the user exemplifying the feeling and the effect of being massaged by hundreds of fingers. It is believed that the impact of air bubbles on the body is soft and much more comfortable for the person than receiving high pressure of streams of water.

Thus it is an object of my invention to provide a new and improved water massage aerator apparatus that may be used easily and inexpensively by a user in his own home.

It is another object of my invention to provide a new and improved water massage aerator apparatus that is inexpensive to manufacture and is simple in use.

It is another object of my invention to provide a new and improved water massage aerator apparatus that may be used with known bathtubs or the like that are normally present in the user's home.

It is another object of my invention to provide a new and improved water massage aerator apparatus that can be easily broken down, sold and reassembled at point of use in an easy, correct and inexpensive manner.

It is another object of my invention to provide a new and improved water massage aerator apparatus that utilizes plastic pipe that is light and noncorrosive and that may be easily disassembled and stored in a compact package.

It is another object of my invention to provide a new and improved water massage aerator apparatus that may be secured to the bottom of a bathtub full of water in an easy, efficient and positive manner that has inherent alignment means for assuring correct assembly at point of use.

Other objects and advantages of my invention will become more apparent upon a reading of the following detailed description in which like parts are designated by like reference numbers and wherein:

FIG. 1 is an overall top plan view of my invention installed in a bathtub or the like.

FIG. 4 is a cross-sectional view taken along lines 4-4 of FIG. 1.

Figure 1:
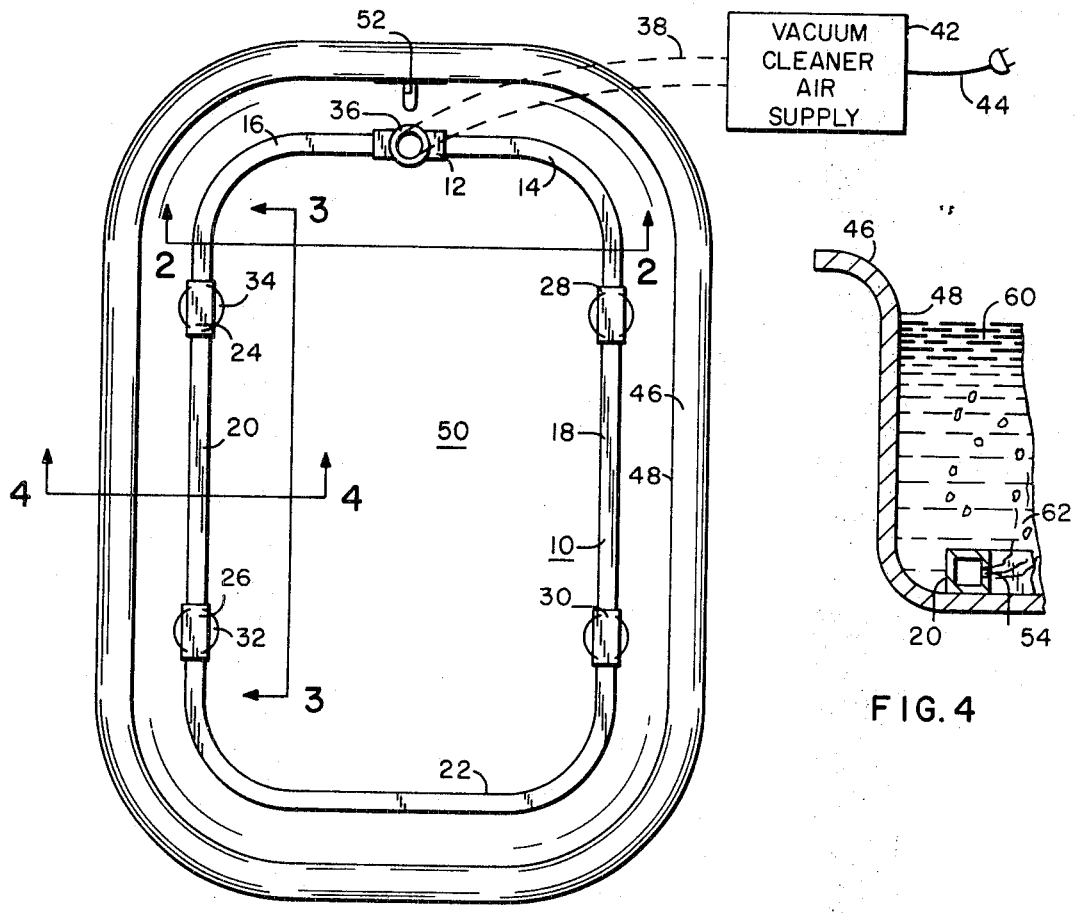
Figure 2:
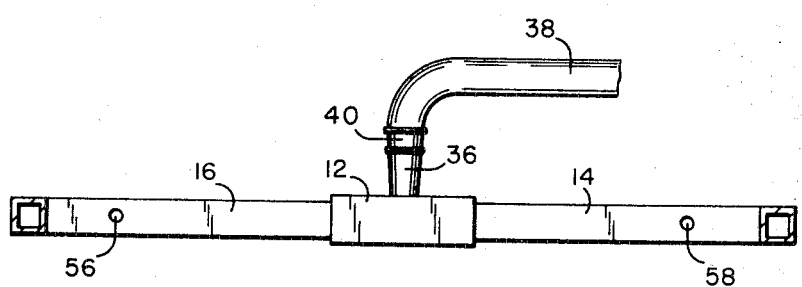
FIG. 2 is an embodiment of one end of a tubing passage of my invention as is represented by a section taken along lines 2-2 of FIG. 1.
Figure 3:
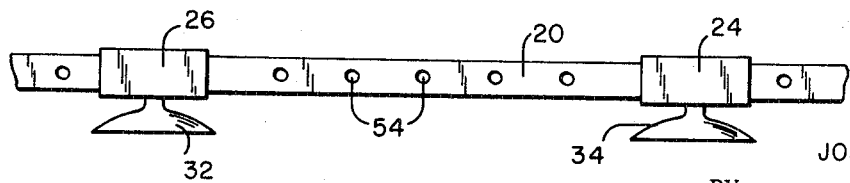
FIG. 3 is a view of a side section of the tubing passage of my invention as generally represented by a view taken along lines 3-3 of FIG. 1.

Referring now to Fig. 1, there is illustrated a portion of well known bathtub having an upper edge surface 46, sides 48, and a bottom 50. The bathtub may hold water 60 as illustrated in FIG. 4. Positioned in the bottom of the bathtub is an embodiment of a closed tubing passage 10 of my invention that is made up of sections of square tubing. The sections include a pair of end sections 14 and 16, side sections 18 and 20 and an end section 22. These sections are joined together by couplings 24, 26, 28, and 30. The tubing is preferably made of plastic or other similar material and the couplings are also made of the same material and accordingly, the sections and coupling are joined together with a tight slip fit as is well known in the art. The air pressures involved are normally low enough that the air does not escape through the slip fit coupling connections. Secured to the lower surface of the couplings 24, 26, 28, and 30 are suction cups 32 that hold the tubing passage 10 on the bottom of the tub 50. The tubing sections 14 and 16 are joined by a coupling 12 that also has an upwardly directed air inlet nozzle 36 that is capable of receiving and being selectively connected to the nozzle 40 of a known vacuum cleaner hose 38 that is connected to the blow side of the vacuum cleaner 42. The vacuum cleaner will generally receive electrical power through a normal electrical connector 44. Water is allowed to enter the tub 50 by a water faucet 52, as is well known in the art.

Air holes 54 are spaced on the tubing sections 18, 20 and 22 to provide air injection nozzles injecting the air into the water 60. As illustrated in FIG. 4, the air leaves the holes 54 and substantially cover the volume of water contained in the bathtub 50. The air thus disturbs the water by having thousands of soft tiny air bubbles that are directed inwardly and upwardly in an action to substantially encircle and cover the limbs and torso of the user. This creates the disturbance in the water that provides the massaging action.

It is to be noted that tube sections 14 and 16 have air holes 56 and 58 that begin only at the curved point on the outer ends of sections 14 and 16. Thus the air holes 56 and 58 are displaced some distance from the inlet coupling 12, which assures that the air received by the inlet coupling 12 is allowed to pass through the entire passage of the tube members 18, 20, and 22 without having an excessive loss of air through holes in or immediately adjacent to the inlet coupling 12.

OPERATION

In operation, the apparatus is received by the user in its disassembled form in a relatively small package. The unit is assembled in an easy and simple to understand manner by the user by merely connecting the square tubing sections 18, 20 and 22 together with the square couplings 24, 26, 28 and 30. The square sections 14 and 16 are connected to the inlet coupling 12 and are in turn connected to couplings 24 and 28. The assembled structure is then inserted into a bathtub or the like having water therein and the suction cups 32 and 34 are pressed against and thus secured to the bottom of the tub 50. It should be recognized that the assembled device can be secured to the tub prior to filling with water through faucet 52. The raised inlet nozzle 36 is sufficiently long to project above the surface of the water, even though the tub 50 may be filled to capacity. A vacuum cleaner air supply is connected through its normal hose 38 and nozzle 40 to the inlet 36 and the vacuum cleaner is energized in the normal manner causing air under pressure to pass through hose 38, inlet 36, through the tubing sections 14, 16, 18, 20 and 22 and out the air nozzles 54, 56 and 58.

While I have shown and described a specific form of my invention, it is to be understood that various changes and modifications may be made without departing from the spirit of the invention as set forth in the appended claims.

I claim:

1. A water massage aerator bath apparatus for injecting air under pressure into water comprising:
 a. an elongated tubing passage being shaped for positioning in a bath container and having holes spaced longitudinally along the tubing passage,
 b. a nozzle connected to the tubing passage to conduct air under pressure to the tubing passage and through the spaced holes,
 c. said tubing passage comprises a plurality of separate tube sections and coupling units to easily connect and disassemble the separate tube sections,
 d. the separate tube sections have a square cross section and the holes are spaced along one side of the tubing,
 e. means connected to the tubing passage for securing the tubing passage to the inner surface of the bath container, and
 f. the tubing passage securing means includes suction cups connected to the coupling units located at spaced intervals along the tubing passage.

2. A water massage aerator bath apparatus for injecting air under pressure into water comprising:
 a. an elongated tubing passage being shaped for positioning in a bath container and having holes spaced longitudinally along the tubing passage,
 b. a nozzle connected to the tubing passage to conduct air under pressure to the tubing passage and through the spaced holes,
 c. the tubing passage comprises separate tube sections including two side tube sections and end tube sections joined by coupling units to the side tube sections,
 d. end tube sections being joined together at one end thereof by a coupling unit which includes means to attach the nozzle and being joined at the other ends thereof to a respective side section by a second pair of coupling units,
 e. said separate tube sections and coupling units include corresponding contact surfaces having a structural configuration to cause the tube sections to fit into the coupling units with the same orientation each time the apparatus is assembled,
 f. means connected to the tubing passage for securing the tubing passage to the inner surface of the bath container; and
 g. the tubing passage securing means including suction cups connected to each of the coupling units.

3. A water massage aerator bath apparatus for injecting air under pressure into water comprising:
 a. an elongated tubing passage being shaped for positioning in a bath container and having holes spaced longitudinally along the tubing passage,
 b. a nozzle connected to the tubing passage to conduct air under pressure to the tubing passage and through the spaced holes,
 c. said tubing passage comprises a plurality of separate tube sections and coupling units to easily connect and disassemble the separate tube sections; and
 d. means connected to said coupling units for securing the tubing passage to the inner surface of the bath container.

4. A water massage aerator apparatus according to claim 3 in which, the separate tube sections are slip fit into the coupling units.

5. A water massage aerator apparatus according to claim 3 in which, said nozzle has a divergent opening for connecting to a hose member that carries the air under pressure.

6. A water massage aerator apparatus according to claim 5 in which, said nozzle is connected to a coupling unit for joining sections of said tubing.

7. A water massage aerator apparatus according to claim 6 in which,
 said nozzle coupling unit interconnects a pair of tubing sections that are curved at their outer ends to conform to the shape of one end of a bathtub,
 and said spaced holes beginning at a point displaced from said nozzle coupling and adjacent to said curve portion.

8. A water massage aerator apparatus according to claim 7 in which, said air under pressure being supplied by a vacuum cleaner air pump or the like positioned at a location removed from the apparatus.

9. A water massage aerator apparatus according to claim 3 in which, the separate tube sections have a square cross section and the holes are spaced along one side of the tubing.

10. A water massage aerator apparatus according to claim 3 in which, the tubing passage comprises a plurality of square plastic tubing sections joined to form a closed rectangle.